Nov. 1, 1932.  W. R. DOW  1,885,337
APPARATUS FOR MOLDING FOOTWEAR
Original Filed April 19, 1930
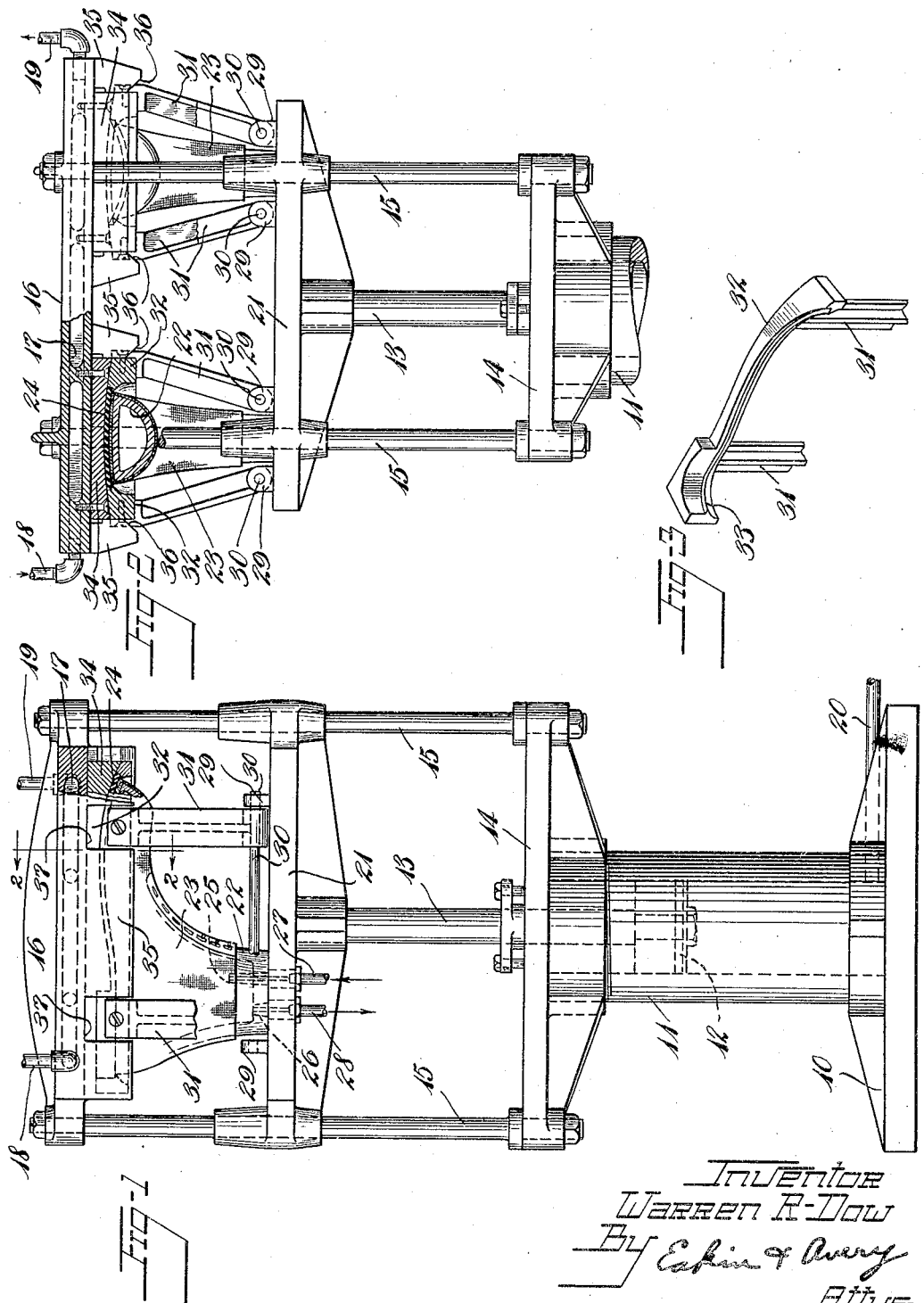

Patented Nov. 1, 1932

1,885,337

UNITED STATES PATENT OFFICE

WARREN R. DOW, OF WATERTOWN, MASSACHUSETTS, ASSIGNOR TO THE B. F. GOODRICH COMPANY, OF NEW YORK, N. Y., A CORPORATION OF NEW YORK

APPARATUS FOR MOLDING FOOTWEAR

Application filed April 19, 1930, Serial No. 445,666. Renewed July 28, 1932.

This invention relates to apparatus for molding footwear, and more especially to apparatus for molding and vulcanizing the soles of rubber soled canvas or leather footwear.

The chief objects of the invention are to produce sharply defined projecting marginal portions on a shoe-sole; to provide a sharply defined juncture of shoe-sole and upper; to provide locally for vulcanization of a shoe-sole without subjecting other portions of the shoe to vulcanizing conditions; and to provide simple apparatus for economically attaining the foregoing objects.

Of the accompanying drawing:

Fig. 1 is a side elevation of apparatus embodying my invention in its preferred form, in operative position, and the work therein, parts being broken away and sectioned.

Fig. 2 is a front elevation of the apparatus shown in Fig. 1, parts being broken away and parts being sectioned on line 2—2 of Fig. 1.

Fig. 3 is a perspective view of a mold member which engages a sole-margin of the work.

Referring to the drawing, 10 is the base member of a vertically positioned fluid pressure cylinder 11, and 12 is the piston thereof which is provided with the usual piston rod 13. Mounted upon the upper end of the cylinder 11 is a stationary spider or platform 14, and rising therefrom are four posts 15, 15 upon the upper ends of which is mounted a stationary platen 16 which is formed internally with a continuous passage 17 for the circulation of heated fluid, such as steam, through the platen to heat the same. Respective inlet and outlet pipes 18, 19 conduct the heated fluid to and from the platen 16. The cylinder 11 is provided with a fluid inlet and outlet pipe 20 by which pressure fluid for lifting the piston 12 is conducted to and from said cylinder.

Mounted upon the upper end of the piston rod 13 is a substantially rectangular movable platen 21, the four corners of which slidably engage the respective posts 15 and are guided thereby. The platen 21 provides a support for one or more shoe-lasts, and is shown herein supporting two shoe-lasts 22, 22 upon each of which is mounted a shoe comprising an upper 23 and a sole 24. The lasts 22 preferably are hollow to admit of internal heating to facilitate vulcanization of the shoe soles 24, although they need not be internally heated if the uppers 23 are of leather.

The lasts 22 are mounted in inverted position upon the platen 21 at respective positions whereat tapered plug members 25, 26 project from the upper face of the platen, said plug members being adapted to interfit with complementally tapered sockets or apertures through the wall of the last, and to support the last in inverted position. The plugs 25, 26 are axially apertured and connect respectively, below the platen, with a fluid inlet pipe 27 and a drain pipe 28 whereby heated fluid such as steam is conducted to the interior of the last and water of condensation removed therefrom. The pipes 27, 28 are flexible to permit vertical movement of the platen 21. Preferably the end of the plug 26 is flush with the inside face of the last to assure complete drainage thereof, and the plug 25 extends somewhat farther into the last so that its discharge orifice is relatively remote from the plug 26 to assure circulation of the steam emitted from said plug 25.

Formed on the upper face of the platen 21, at each side of the shoe-mounting positions thereon, are respective pairs of apertured ears 29, 29, the apertures of each pair being axially aligned parallel to the plane of the shoe 23. A shaft 30 is journaled in the apertures of each pair of ears 29, and secured to said shaft are parallel radial arms 31, 31, to the free ends of which is secured one section 32 of a shoe-sole mold. Two of the sections 32 are required for each shoe, each being so shaped and arranged as to engage the edge of the shoe-sole 24, from toe to heel, on one side of the shoe. Each mold member 32 is formed with a rib or bead 33 extending lengthwise of its molding face adapted to engage the shoe-upper 23 adjacent the sole 24 to prevent flow of the latter onto the upper during the molding and vulcanizing of said sole. The pivotal mounting of the mold sections 32 permits them to be swung clear of the work and to rest upon the platen 21 in the inoperative position of the apparatus.

Mounted upon the under side of the platen 16, over the shoe-mounting positions of the platen 21, are respective mold sections 34, 34 adapted, in the operation of the apparatus, to engage the bottoms of the respective shoe-soles 24. The mold sections 34 may have any desired surface configuration to be impressed in the shoe-soles, and they are heated by conduction from the heated platen 16. When the mold sections 32, 32, 34 are juxtaposed about a shoe-sole they completely confine all portions thereof except its face which is attached to the shoe, and the top faces of the sections 32 are shaped complemental to the bottom face of the sections 34 to provide accurate interfitting of the assembled sections.

Extending downwardly from the under side of the platen 16, at each side of each mold section 34, are ribs or lugs 35, 35 which extend below said mold sections and have their lower inner corners beveled as at 36 (Fig. 2) below said sections. Thus the lugs 35 comprise cams which are adapted, in the operation of the apparatus, to engage respective mold sections 32 and force them toward the work before the mold section 34 engages the work. The lugs 35 are cut away at 37, 37 to receive the arms 31 which carry the mold sections 32.

In the operation of the apparatus, the platen 21 initially is in lowered position, the arms 31 and mold sections 32 carried thereby rest upon said platen, and steam is shut off in the pipes 27. A last 22 with a shoe 23 and rubber sole 24 thereon is mounted upon the platen 21 at each of the shoe-mounting positions thereon, the plugs 25, 26 at said positions fitting within the complemental sockets in the lasts 22. The arms 31 with the mold sections 32 thereon are then manually raised to upstanding position so that the said sections engage the edges of the shoe-soles 24, and while so held pressure fluid is admitted to the cylinder 11 to raise the platen 21. Unless the ribs 33 of the mold sections 32 are seated snugly against the uppers 23 of the shoes, the cam faces 36 of the lugs 35 will engage the corners of said mold sections and urge the latter against the work. Continued rising of the platen 21 carries the shoe-soles 24 into engagement with the heated mold sections 34 against which they are forcibly pressed. Unless the upper 23 is of leather, steam may now be admitted through the pipes 27 to the interior of the lasts, thereby to supplement the heat of the mold sections 34 in effecting vulcanization of the shoe-soles 24. After the latter are vulcanized steam in the pipes 27 is shut off, the platen 21 is lowered, and the finished work is removed, the apparatus then being ready to repeat the operations as described.

Preferably the shoe-sole 24 initially is slightly larger, either in thickness or area, than it is in the finished product, thereby providing an excess of material which results in the sole being under pressure during vulcanization whereby clear, sharp impressions are produced in the sole by the mold.

The apparatus is simple in construction and is readily adaptable to vulcanizing footwear of various sizes and designs. The mold sections 34 are kept hot continuously, and as the interval between vulcanizing operations is short but little heat is wasted. Also conservation of the heat in the lasts 22 may be effected, if desired, by permitting the lasts to remain in the apparatus and mounting shoes thereon at the beginning of each vulcanizing operation and removing them from the last when vulcanized without removing the lasts from the apparatus.

The hinging of the mold sections 32 from the platen which supports the shoe, provides for lateral confinement of the sole of the shoe in advance of the application of pressure on the tread of the sole and assures movement of the mold sections with the shoe avoiding dragging of the edges of the sole. It also assures engagement of the mold sections 32 at the proper level with relation to the last.

The placing of the pivots 30 relatively close to the base of the last provides for swinging movement of mold sections 32 with respect to the sole of the shoe at an acute angle so that the ribs 33 swing under the sole to seating engagement with both the sole and the upper without interference in both the closing and opening operations. This construction also assures rigidity of the assembled mold structure and automatic opening of the mold sections 32 by reason of their centers of gravity falling outside the lines of hinging.

The invention may be modified within the scope of the appended claims as I do not limit my claims to the specific construction shown and described.

I claim:

1. In apparatus for molding soles on footwear, the combination of a stationarily mounted sole-molding mold section, a support for a lasted shoe movable toward and away from said mold section, a pair of sole-engaging mold sections pivotally mounted upon said support and adapted to contact with the upper of the shoe only adjacent the upper margin of the sole, and means for moving the pivotally mounted mold sections toward the shoe upper as an incident to the movement of the work support toward the stationary mold section.

2. In apparatus for molding soles on footwear, the combination of a stationary heated platen, a sole engaging mold section mounted thereon, a platen movable with relation to the stationary platen adapted to support a lasted shoe, a pair of mold sections pivotally mounted upon said movable platen and adapted to contact with the shoe only adjacent the upper margin of the sole, and means on said stationary platen for moving the mold sections on the movable platen into engagement with the shoe upper as an incident to the movement of the movable platen toward the stationary platen.

3. Apparatus for molding soles on footwear, said apparatus comprising a pair of opposed press platens, means for moving one of the platens toward the other, a sole molding member mounted on one of the platens, a shoe-supporting last carried by the other platen for cooperation therewith, a plurality of edge-molding members hinged to the last supporting platen, and extending therefrom in spaced relation to the shoe on said last and means mounted on the sole-mold supporting platen for engaging said edge molding members and causing a lateral movement thereof toward the shoe and into contact therewith only adjacent the upper margin of the sole during the movement of the last-carrying platen.

4. Apparatus for molding soles on footwear, said apparatus comprising a sole molding member and a shoe supporting member mounted on opposed press platens, means for causing movement of one of the said members toward the other, and cooperating means carried by the respective platens for laterally confining a shoe sole during said movement in advance of its confinement between said sole-molding and shoe-supporting members, the lateral-confining means carried by the shoe-supporting platen comprising the sole-contacting member and being so hinged to the platen as to swing to an acute angle with respect to the sole of the shoe during relative movement of the platens.

In witness whereof I have hereunto set my hand this 14th day of April, 1930.

WARREN R. DOW.